United States Patent [19]

Tano et al.

[11] 4,306,785
[45] Dec. 22, 1981

[54] CAMERA EXPOSURE TIME CONTROL CIRCUIT

[75] Inventors: Eiichi Tano, Kamifukuoka; Koji Suzuki, Asaka, both of Japan

[73] Assignee: Asahi Kogaku Kogyo Kabushiki Kaisha, Tokyo, Japan

[21] Appl. No.: 113,003

[22] Filed: Jan. 17, 1980

[30] Foreign Application Priority Data

Feb. 1, 1979 [JP] Japan .................................. 54-10566
Feb. 1, 1979 [JP] Japan .................................. 54-10567
Feb. 1, 1979 [JP] Japan .................................. 54-10568

[51] Int. Cl.³ ...................... G03B 17/18; G03B 7/093
[52] U.S. Cl. ................................. 354/23 D; 354/24; 354/60 A; 354/60 L
[58] Field of Search ............... 354/23 D, 24, 50, 51, 354/60 A, 60 E, 60 L, 53–57, 289

[56] References Cited

U.S. PATENT DOCUMENTS 4,089,012 5/1978 Kawasaki ..................... 354/23 D
4,171,884 10/1979 Tokutomi ..................... 354/23 D Primary Examiner—L. T. Hix
Assistant Examiner—William B. Perkey
Attorney, Agent, or Firm—Sughrue, Mion, Zinn, Macpeak & Seas

[57] ABSTRACT

A combined manual and automatic exposure time control circuit for a camera in which automatic exposure data produced through photometric techniques and manual exposure data set manually are coupled through a switching circuit to a time determination circuit which controls the camera exposure time. The automatic exposure data is produced by a calculation circuit which receives inputs relating to the logarithmic compression values of the object brightness, the film sensitivity, aperture value and exposure setting to thereby digitally calculate the proper exposure time. The output of the calculator is selectively coupled through a switching circuit along with the analog-to-digitally converted manual exposure time setting data to an expansion time determination circuit. The two analog signals are also converted to digital form and selectively coupled through a second switching circuit along with the direct manual exposure data to a display unit with selection being made in accordance with whether a manual or an automatic mode of operation is chosen.

3 Claims, 6 Drawing Figures

CAMERA EXPOSURE TIME CONTROL CIRCUIT

BACKGROUND OF THE INVENTION

The present invention relates to an exposure time control circuit for a camera having two automatic exposure time control functions (hereinafter referred to merely as "AUTO" when applicable) as well as a manual exposure time control (hereinafter referred to merely as "MANU" when applicable).

Cameras having two control functions according to the following systems have been proposed in the art.

(1) A first system in which "AUTO" is electrically implemented but "MANU" is mechanically implemented.

(2) A second system in which both "AUTO" and "MANU" are electrically implemented. In such a system, the time determination of one or both of "AUTO" and "MANU" is effected by a digital circuit.

(3) A third system in which both "AUTO" and "MANU" are electrically implemented. In this system, the resistance value of a resistor provided for "MANU" is varied by a so-called shutter dial.

However, a camera according to the first system is disadvantageous in that, since the manual exposure time control is mechanically implemented, the mechanism is rather intricate and the mechanism requires a rather large part of the space available in the camera. A camera according to the second system is also disadvantageous in that, since the time determination must be done with a digital circuit, the required electrical circuit is large in size and intricate and costly to manufacture thereby significantly contributing to increasing the total manufacturing cost. A camera according to the third system suffers from problems in that, when the space occupied by the resistor and the reliability of the connection between the resistor and its contactor are taken into account, the camera itself is low in reliability and moreover is difficult to miniaturize. In addition, a common drawback accompanying all three systems is that a shutter dial is required for manual exposure time control which is an obstruction to the effective utilization of the space available in the camera.

In the case where the background is much brighter than an object as in the case of taking a picture of a person on a slope or in the case where, contrary to the above-described case, an object is much brighter than the background as in the case of taking a picture of a person spotlighted, it is necessary for the operator of a camera which has the two functions described above to intentionally set the exposure factor to a value such as two, four times, ½ or ¼ times what would otherwise be used. For this purpose, in the case of "AUTO", a technique has been proposed in which the resistance of a film sensitivity changing resistor is changed by a member such as a dial. In the case of "MANU" operation, a mechanical control technique utilizing a cam and a technique including changing the resistance of a manual exposure time setting resistor have been employed. In both of these cases, it is necessary to set a manual exposure time with a so-called "shutter dial".

There has been a strong demand for reducing the size and manufacturing cost of a camera. A camera having the two functions of "AUTO" and "MANU" is disadvantageous in this regard in that is is necessary to provide two members, an exposure factor setting member such as a dial and a shutter dial which are quite large in size and high in manufacturing cost. In addition, the camera surffers from a problem in that it requires a number of contact points between the mechanism and the resistors and accordingly its reliability is relatively low.

SUMMARY OF THE INVENTION

In view of the above-described drawbacks, an object of the present invention is to provide an automatic and manual exposure time control circuit which is extremely simple in construction.

A specific feature of a circuit in accordance with the invention resides in that automatic exposure time data calculated through photometry and manual exposure time data digitally set are applied through a switching circuit to a time determination circuit thereby to effect exposure time control.

A further object of the invention is to provide an exposure time displaying circuit which is simple in construction and in which an automatic exposure film in an "AUTO" mode and a manual exposure time provided as digital data by mechanical switch means in the "AUTO" mode are displayed by a display element.

In accordance with this object, one feature of the invention resides in that digital data produced by subjecting to analog-to-digital conversion a voltage corresponding to an automatic exposure time, which was calculated using an analog technique, and digital data corresponding to a manual exposure time provided as digital data are applied through switching circuits to the drive circuit of the display element so that both automatic and manual exposure times can be displayed on the same display element.

The exposure time control circuit according to the invention is so designed that the "on" and "off" signals of a mechanical switch are applied through switching circuits to an exposure factor setting circuit or a manual exposure time setting circuit. With the aid of the mechanical switch, the exposure time control circuit serves as an exposure factor setting member in the "AUTO" mode and as a manual exposure time setting member in the "MANU" mode.

DESCRIPTION OF THE PREFERRED EMBODIMENTS

A preferred embodiment of an exposure time control circuit according to the invention will be described with reference to the accompanying drawings.

Figure 1:
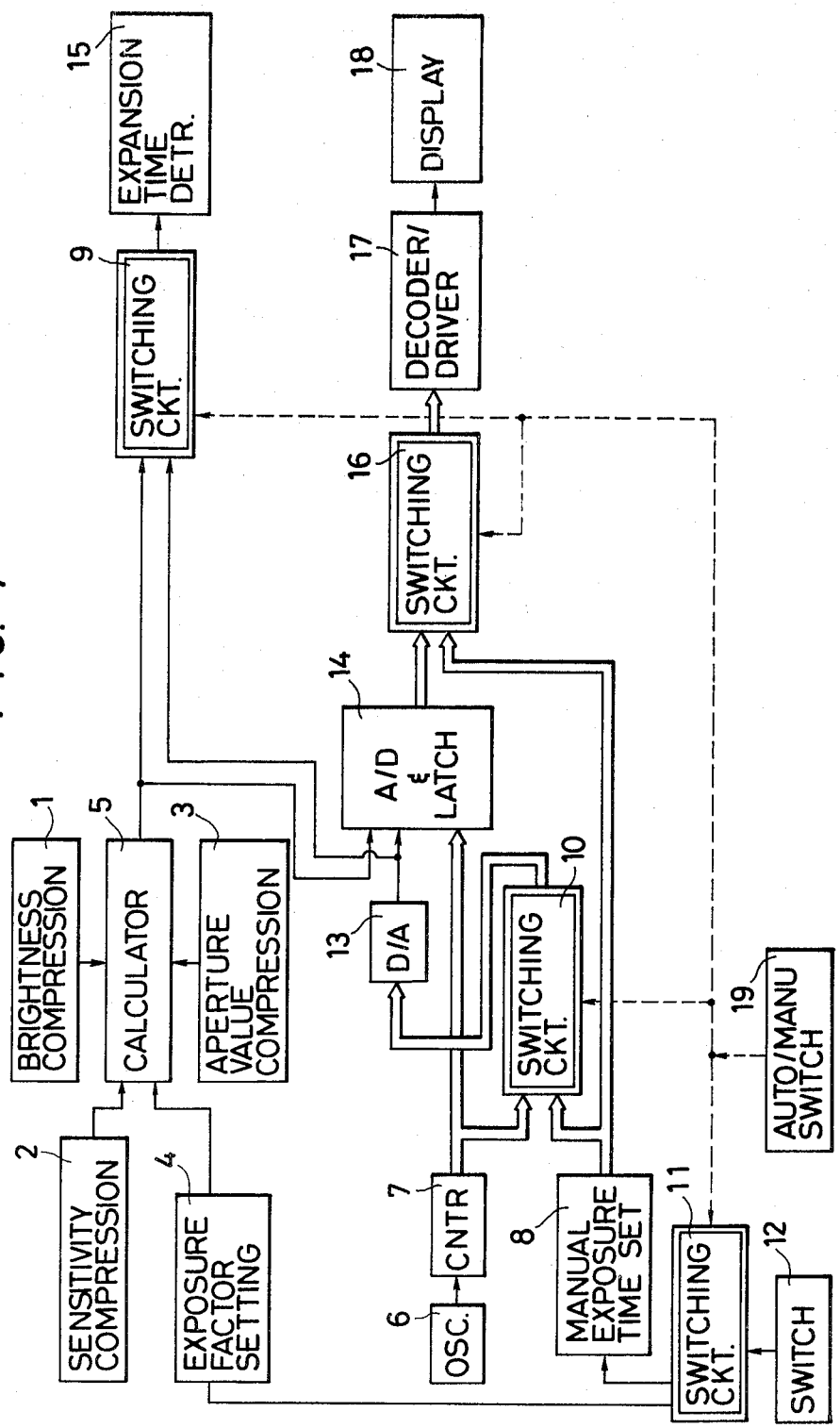
FIG. 1 is a block diagram of a preferred embodiment of an exposure time control circuit according to the invention.

FIG. 1 is a block diagram showing the exposure time control circuit. This circuit includes a brightness compression circuit 1 for providing an object's brightness APEX value $B_V$, a film sensitivity compression circuit 2 for producing a film sensitivity APEX value $S_V$, an aperture value compression circuit 3 for providing a camera aperture APEX value $A_V$, an exposure factor setting circuit 4 for providing the logarithmic compression value of an exposure factor (which is given by $X_V = \log_2 X$ where $X_V$ is the APEX equivalent value and X is the exposure factor) with the outputs of the circuits 1 through 4 applied to a calculation circuit 5, an oscillator circuit 6 for generating clock pulses with the oscillator circuit 6 connected to a counter 7 adapted to count the output pulses of the oscillator circuit 6, and a manual exposure time setting circuit 8.

The manual exposure time setting circuit 8 receives the output signal of a switch circuit 12 through a switching circuit 11. The output of the circuit 8 together with the output of the aforementioned counter 7 is applied to a switching circuit 10. The output of the switching circuit 10 is applied to a digital-to-analog (D/A) converter circuit 13. The output of the converter circuit 13 and the outputs of the calculation circuit 5 and the counter 7 are applied to an analog-to-digital conversion and latch circuit 14. The output of the D/A converter circuit 13 together with the output of the calculation circuit 5 is applied to a switching circuit 9, the output of which is applied to an expansion time determination circuit 15. The output of the A/D conversion and latch circuit 14 together with the output of the above-described manual exposure time setting circuit 8 is applied to a switching circuit 16 the output of which is applied through a decoder and driver circuit 17 to drive an exposure time displaying element 18. An output signal of the switch circuit 12 is applied through the switching circuit 11 to the exposure factor setting circuit.

Referring further to FIG. 1, reference numeral 19 designates an "AUTO" and "MANU" switching circuit the output of which is applied to the above-described switching circuits 9, 10, 11 and 16. In the case of "AUTO", the "AUTO" and "MANU" switching circuit causes the switching circuits to couple the calculation circuit 5 to the expansion time determination circuit 15, the counter 7 to the D/A converter circuit 13, the switch circuit 12 to the exposure factor setting circuit 4, and the A/D conversion and latch circuit 14 to the display element 18. In the case of "MANU", the switching circuits couple the D/A converter circuit 13 to the expansion time determination circuit 15, the manual exposure time setting circuit 8 to the D/A converter circuit 13, the switch circuit 12 to the manual exposure time setting circuit 8, and the manual exposure time setting circuit 8 to the display element 18.

The operation of the circuit thus organized will be described. First, for the case of "AUTO", the following calculation is carried out by the calculation circuit:

$$S_V + B_V - A_V - X_V. \tag{1}$$

Under the condition that an exposure factor is taken into account in the APEX equation, $$S_V + B_V - X_V = A_V + T_V, \tag{2}$$

where $T_V$ is the exposure time APEX value. Accordingly, as is clear from the equations (1) and (2), the value $T_V$ corresponding to automatically controlled exposure time is applied by the calculation circuit 5 to the expansion time determination circuit 15 through the switching circuit 9 so that the shutter of the camera is controlled by conventional means so that a picture of correct exposure is obtained. As the outputs of the calculation circuit 5, the counter 7 and the D/A converter circuit 13 are applied to the A/D conversion and latch circuit 14 by a circuit as disclosed, for instance, in Japanese Laid-Open Patent Application No. 56924/1977, the output of the calculation circuit 5 is subjected to analog-to-digital conversion, is latched and is then applied through the switching circuit 16 to the decoder and driver circuit 17 thereby to cause the display element 18 to display the automatic exposure time. As the output signal of the switch circuit 12 is applied through the switching circuit 11 to the exposure factor setting circuit 4, in the case of "AUTO", the switch circuit 12 functions as exposure factor setting means.

Next, the case of "MANU" operation will be described. The manual exposure time setting circuit 8, receiving the output signal of the switch circuit 12 through the switching circuit 11, provides digital data corresponding to a set exposure time. The output of the manual exposure time setting circuit 8 is applied through the switching circuit 10 to the D/A converter circuit 13. The digital data inputted to the D/A converter circuit 13 is converted into analog data which is applied to the expansion time determination circuit 15 through the switching circuit 9 whereby the exposure time is set from the switch circuit 12. On the other hand, the output of the manual exposure time setting circuit 8 is applied through the switching circuit 16 to the decoder and driver circuit 17 to cause the display element 18 to display the manually set exposure time.

As is clear from the above description, the switch circuit 12 serves both as an exposure factor setting means for "AUTO" operation and as a manual exposure time setting means for "MANU" operation. The display element 18 serves as an exposure time displaying device for both "AUTO" and "MANU".

Figure 2:
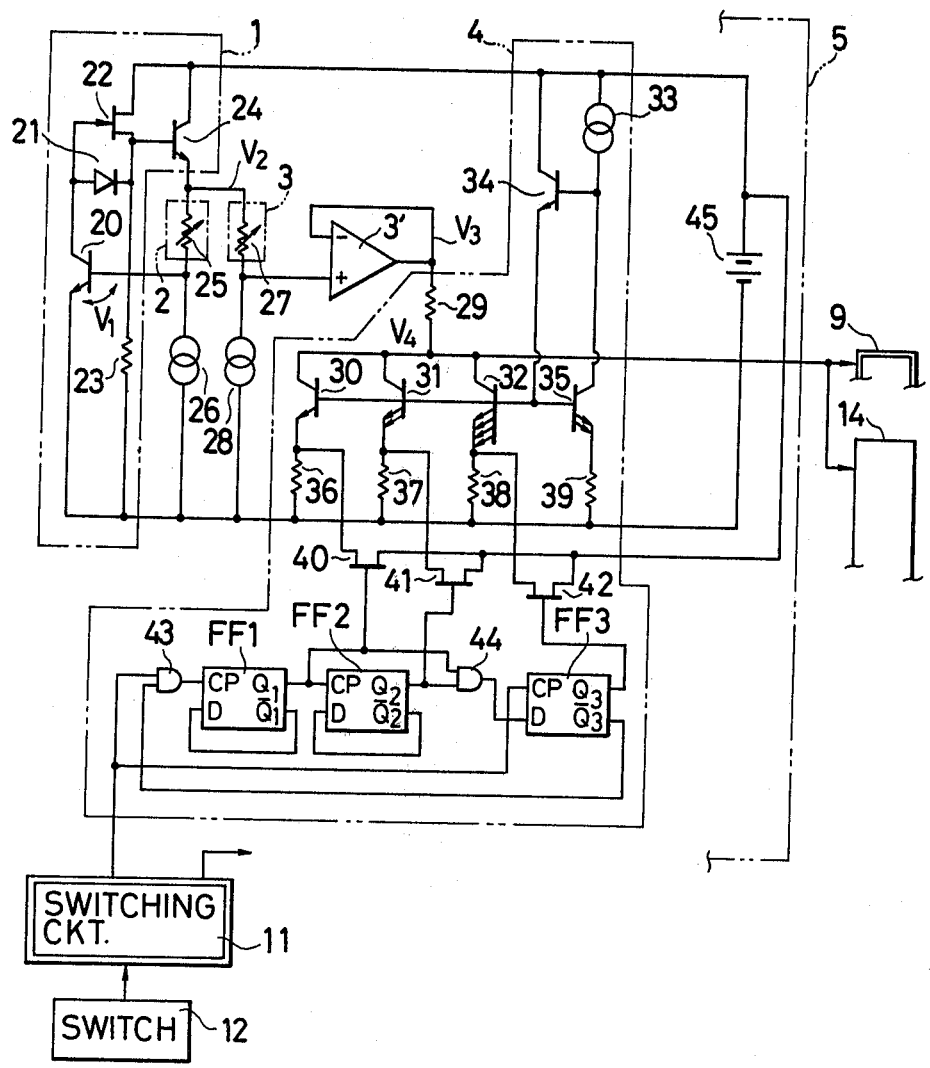
FIG. 2 is a circuit diagram, partly as a block diagram, showing examples of a brightness compression circuit, a film sensitivity compression circuit, an aperture value compression circuit, an exposure factor setting circuit, and a calculation circuit shown in FIG. 1.

Shown in FIG. 2 are specific examples of the brightness compression circuit 11, the film sensitivity compression circuit 2, the aperture value compression circuit 3, the exposure factor setting circuit 4, and the calculation circuit 5. In FIG. 2, reference numeral 20 designates a logarithmic compression transistor. The collector of the transistor 20 is connected to the gate of a self-bias type field-effect transistor (FET) 22 with a light receiving element 21 and a resistor 23. The source of the FET 22 is connected to the base of an emitter follower transistor 24 which is coupled to a circuit composed of an $S_V$ variable resistor 25 corresponding to a film sensitivity APEX value $S_V$. The emitter of transistor 24 is also connected to a constant current source 26 and to a circuit composed of an $A_V$ variable resistor 27 corresponding to an aperture value APEX value $A_V$ and a constant current source 28. The connecting point of the $S_V$ variable resistor 25 and the constant current source 26 is connected to the base of the logarithmic compression transistor 20. The connecting point of the $A_V$ variable resistor 27 and the constant current source 28 is connected to the non-inverting input terminal of a voltage follower type operational amplifier 3'. The ratio of the emitter areas of transistors 30, 31 and 32 and 35 is 1:2:4:2. The collectors of these transistors are connected through a resistor 29 to the output terminal of the operational amplifier 3'. The emitters of the transistors 30, 31 and 32 are connected to resistors 36, 37 and 38 and to the sources of FET's 40, 41 and 42, respectively. The gates of the FET's 40, 41 and 42 are connected to outputs $Q_1$, $Q_2$ and $Q_3$ of flip-flips FF1, FF2 and FF3, respectively, while the drains are connected to a power source 45. The output of a constant current source 33 is applied to the collector of a transistor 35. The collector of the transistor 35 is coupled to the base of transistor 34. AND gates 43 and 44 and the flip-flops FF1, FF2 and FF3 form a quinary counter. In response to the application of pulses from the switching circuit 11, the following logic levels are successively provided at the outputs $Q_1$, $Q_2$ and $Q_3$ of the flip-flops.

TABLE 1

| $Q_3$ | $Q_2$ | $Q_1$ |
|---|---|---|
| 0 | 0 | 0 |
| 0 | 0 | 1 |
| 0 | 1 | 0 |
| 0 | 1 | 1 |
| 1 | 0 | 0 |

In Table 1, "0" is a low logic level in a logic circuit, and "1" is a high logic level.

In operation, the logarithmic compression transistor 20 is driven with a constant current by the optical current produced by the light receiving element 21. Feedback is effected from the collector of the transistor 20 through the FET 22, the transistor 24 and the $S_V$ variable resistor 25 to the base of the transistor 20. In this case, the base-emitter voltage $V_1$ of the transistor 20 is:

$$V_1 = \frac{KT}{q} \ln \frac{i_p}{i_0} + V_0 \quad (3)$$

where K is Boltzmann's constant, T is the absolute temperature, q is the electron charge, and $V_0$ is the base-emitter voltage with a collector current $i_0$.

If the resistance of the $S_V$ variable resistor 25 is represented by $R_{25}$ and the current of the constant current source 26 is represented by $i_{26}$, then the emitter potential $V_2$ of the transistor 24 is:

$$V_2 = V_1 + i_{26} \cdot R_{25}. \quad (4)$$

If the resistance of the $A_V$ variable resistor 27 is represented by $R_{27}$ and the current of the constant current source 28 is represented by $i_{28}$, then the output voltage $V_3$ of the operational amplifier 3' is:

$$V_3 = V_2 - i_{28} \cdot R_{27}. \quad (5)$$

The outputs of the flip-flops FF1, FF2 and FF3 are applied to the gates of the FET's 40, 41 and 42, respectively, to control the latter. Each FET is rendered conductive when the output applied to the gate is at "1" and is rendered non-conductive when the output applied to the gate is at "0". The emitters of the transistors 30, 31 and 32 are connected to the sources of the FET's 40, 41 and 42, respectively. Accordingly, when the transistors 30, 31 and 32 are rendered on or off, the FET's 40, 41 and 42 are rendered on or off, respectively.

If the current of the constant current source 33 is represented by $i_{33}$ and the ratio of the resistances of the resistors 36, 37, 38 and 39 is so selected as to be 4:2:1:2, then currents $i_{33}/2$, $i_{33}$ and $2 \times i_{33}$ flow in the collectors of the transistors 30, 31 and 32, respectively. Accordingly, if the resistance of the resistance 29 is represented by $R_{29}$, then the collector voltage $V_4$ of the transistors 30, 31 and 32 is as indicated in the following Table 2 (which incorporates Table 1) when the FET's 40, 41 and 42 are switched.

TABLE 2

| State (=N) | $Q_3$ | $Q_2$ | $Q_1$ | FET 42 | FET 41 | FET 40 | $V_4$ |
|---|---|---|---|---|---|---|---|
| 0 | 0 | 0 | 0 | OFF | OFF | OFF | |
| 1 | 0 | 0 | 1 | OFF | OFF | ON | $V_4 = V_3 - (7 - N) \times$ |
| 2 | 0 | 1 | 0 | OFF | ON | OFF | $\frac{i_{33}}{2} R_{29}$ |
| 3 | 0 | 1 | 1 | OFF | ON | ON | |
| 4 | 1 | 0 | 0 | ON | OFF | OFF | |

Substituting the equations (3), (4) and (5) into the equation (6), $$V_4 = \frac{KT}{q} \cdot \ln \frac{i_p}{i_o} + V_0 + i_{26} \cdot R_{25} - i_{28} \cdot R_{27} - \quad (7)$$

$$(7 - N) \times \frac{i_{33}}{2} \cdot R_{29}.$$

In equation (7), $i_p = i_{po} \cdot 2^{B_v}$, where $i_{po}$ is the optical current with $B_V = 0$. Therefore, $$V_4 = B_V \cdot \frac{KT}{q} \cdot \ln 2 + i_{26} \cdot R_{25} - i_{28} \cdot R_{27} - (7 - N) \times \quad (8)$$

$$\frac{i_{33}}{2} \cdot R_{29} + C$$

where $$C = \frac{KT}{q} \cdot \ln \frac{i_{po}}{i_o} + V_0.$$

In the equation (8), the first term $$B_V \frac{KT}{q} \ln 2$$

represents displacement corresponding to an object's brightness variation, and $$\frac{KT}{q} \ln 2$$

represents the amount of variation per step of $1E_V$. If $i_{26} \cdot R_{25}$ and $i_{28} \cdot R_{27}$ are so selected that the displacement per step is $$\frac{KT}{q} \ln 2,$$

then $i_{26} \cdot R_{25}$ and $i_{28} \cdot R_{27}$ can be replaced with $$S_V \cdot \frac{KT}{q} \ln 2 \text{ and } A_V \cdot \frac{KT}{q} \ln 2,$$

respectively. Therefore, $$V_4 = \frac{KT}{q} \ln 2 (B_V + S_V - A_V) - (7 - N) \times \frac{i_{33}}{2} \cdot R_{29} + C. \quad (9)$$

If, in the equation (9), $N = 2 - X_V$ and $i_{33}/2 \cdot R_{29}$ is so selected as to be $$\frac{KT}{q} \ln 2,$$

then the equation (9) can be rewritten as the following equation (10).

$$V_4 = \frac{KT}{q} \ln 2 \, (B_V + S_V - A_V - X_V) + C' \tag{10}$$

where $$C' = C - 5 \frac{KT}{q} \ln 2.$$

In the equation (10), $X_V$ is defined by the output state N of the quinary counter. If, where $X_V = 0$ (N=2), the exposure factor is selected so as to be unity, then the values $X_V = 2, 1, 0, -1$ and $-2$ are obtained corresponding to the values N=0, 1, 2, 3 and 4. Thus, the exposure factor can be 4, 2, 1, ½ and ¼.

From the equations (2) and (10), $$V_4 = T_V \frac{KT}{q} \ln 2 + C'. \tag{11}$$

In the equation (11), C' is a constant which depends on none of the object's brightness, film sensitivity, camera aperture value or exposure factor. Therefore, exposure time control in which exposure factors are taken into account can be carried out by providing the value $V_4$ represented by the equation (11) to the above-described expansion time determination circuit 15.

Figure 3:
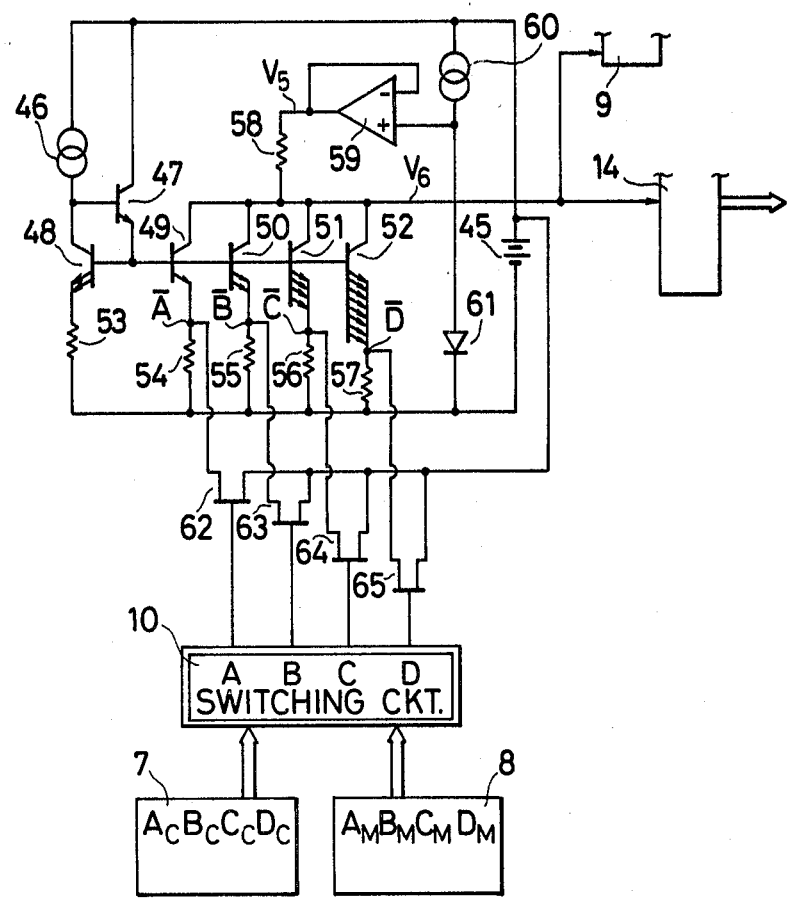
FIG. 3 is a circuit diagram, partly as a block diagram, showing a D/A converter circuit shown in FIG. 1.

Shown in FIG. 3 is a specific example of the D/A converter circuit 13. In FIG. 3, reference numeral 46 designates a constant current source the output of which is applied to the collector of a transistor 48. Feedback is effected from the collector of the transistor 48 to the base thereof through a transistor 47. The ratio of the emitter areas of transistors 49, 50, 51 and 52 is 1:2:4:8. The emitters A, B, C and D of these transistors are connected to resistors 54, 55, 56 and 57 and to the sources of FET's 62, 63, 64 and 65, respectively. The drains of these FET's are connected to the positive terminal common power source 54 while the gates thereof are connected to the outputs A, B, C and D of the above-described switching circuit 10, respectively. By means of the switching circuit 10, the gates of the FET's 62, 63, 64 and 65 are selectively connected to the outputs $A_C$, $B_C$, $C_C$ and $D_C$, corresponding to bits $2^0$, $2^1$, $2^2$ and $2^3$, respectively, of the counter 7 having a 4-bit output in the case of "AUTO" and are connected to the outputs $A_M$, $B_M$, $C_M$ and $D_M$, corresponding to bits $2^0$, $2^1$, $2^2$ and $2^3$, respectively, of the manual exposure time setting circuit 8 in the case of "MANU".

Reference numeral 60 designates a constant current source the output of which is applied to the anode of a diode 61. The anode of the diode 61 is connected to the non-inverting input terminal of a voltage follower type operational amplifier 59. The output terminal of the operational amplifier 59 is connected through a resistor 58 to the collectors of the transistors 49 through 52 and hence to the above-described switching circuit 9 and to the A/D converter circuit 14.

The operation of the circuit shown in FIG. 3 will next be described. If the current value of the constant current source 46 is represented by $i_{46}$ and the ratio of the resistance of the resistors 53, 54, 55, 56 and 57 is selected to be 4:8:4:2:1, then the collector currents can be represented by $i_{46}/2$, $i_{46}$, $2 \times i_{46}$ and $4 \times i_{46}$, respectively. If the current of the constant current source 60 is represented by $i_{60}$, then the output $V_5$ of the operational amplifier is:

$$V_5 = \frac{KT}{q} \ln \frac{i_{60}}{i_o} + V_0 \tag{12}$$

where $V_0$ is the forward voltage of the diode 61 with the forward current $i_o$.

The operational amplifier 59 thus functions as a constant voltage source for generating the voltage $V_5$. If a voltage drop $$\frac{i_{46}}{2} \times R_{58}$$

(where $R_{58}$ is the resistance of the resistor 58) due to the collector current of the transistor 49 is set equal to $$\frac{KT}{q} \ln 2,$$

then the collector potential $V_6$ of the transistors 49 through 52 is defined as indicated in the following Table 3 with the FET's 62, 63, 64 and 65 switched by the outputs A, B, C and D of the switching circuit.

TABLE 3

| State (=N) | D | C | B | A | FET 65 | FET 64 | FET 63 | FET 62 | $V_6$ |
|---|---|---|---|---|---|---|---|---|---|
| 0 | 0 | 0 | 0 | 0 | OFF | OFF | OFF | OFF | |
| 1 | 0 | 0 | 0 | 1 | OFF | OFF | OFF | ON | |
| 2 | 0 | 0 | 1 | 0 | OFF | OFF | ON | OFF | |
| 3 | 0 | 0 | 1 | 1 | OFF | OFF | ON | ON | |
| 4 | 0 | 1 | 0 | 0 | OFF | ON | OFF | OFF | $V_6 = V_5 -$ |
| 5 | 0 | 1 | 0 | 1 | OFF | ON | OFF | ON | $(15 - n) \cdot$ |
| 6 | 0 | 1 | 1 | 0 | OFF | ON | ON | OFF | $\frac{KT}{q} \ln 2$ |
| 7 | 0 | 1 | 1 | 1 | OFF | ON | ON | ON | (13) |
| 8 | 1 | 0 | 0 | 0 | ON | OFF | OFF | OFF | |
| 9 | 1 | 0 | 0 | 1 | ON | OFF | OFF | ON | |
| 10 | 1 | 0 | 1 | 0 | ON | OFF | ON | OFF | |
| 11 | 1 | 0 | 1 | 1 | ON | OFF | ON | ON | |
| 12 | 1 | 1 | 0 | 0 | ON | ON | OFF | OFF | |
| 13 | 1 | 1 | 0 | 1 | ON | ON | OFF | ON | |
| 14 | 1 | 1 | 1 | 0 | ON | ON | ON | OFF | |
| 15 | 1 | 1 | 1 | 1 | ON | ON | ON | ON | |

With $n = T_{VM} + 4$ in the equation (13), the following equation (14) may be written:

$$V_6 = T_{VM} \frac{KT}{q} \ln 2 + C'' \tag{14}$$

where $$C'' = V_5 - 11 \frac{KT}{q} \ln 2$$

The value C'' is a constant independent of the output of the manual exposure time setting circuit 8. If the value $T_{VM}$ is ragarded as a manual exposure time APEX value and the voltage $V_6$ is applied to the expansion time determination circuit 15 similar to the case of the equation (11), then the manual exposure time control may be executed accordingly. In the case of "MANU" operation, the outputs $A_M$, $B_M$, $C_M$ and $D_M$ of the manual exposure time setting circuit 8 are applied through the switching circuit 16 to the decoder and driver circuit 17 as a result of which the manually set exposure time is displayed on the display element 18. For "AUTO" operation, the 4-bit counter 7 carries out its counting operation in response to clock pulses from the oscillator circuit 6 and the output voltage $V_6$ of the D/A converter circuit 13 is applied in a time-series mode as a stair step waveform having a step voltage of $$\frac{KT}{q} \ln 2$$

to the A/D conversion and latch circuit 14. As, in this connection, the output voltage of the calculation circuit 5 represented by the equation (11) and the output of the 4-bit counter 7 are applied to the A/D conversion and latch circuit 14, the output voltage of the calculation circuit 5 is subjected to digital conversion and is latched and is then applied to the decoder and driver circuit. As a result, the automatic exposure time is displayed on the display element 18.

Figure 4:
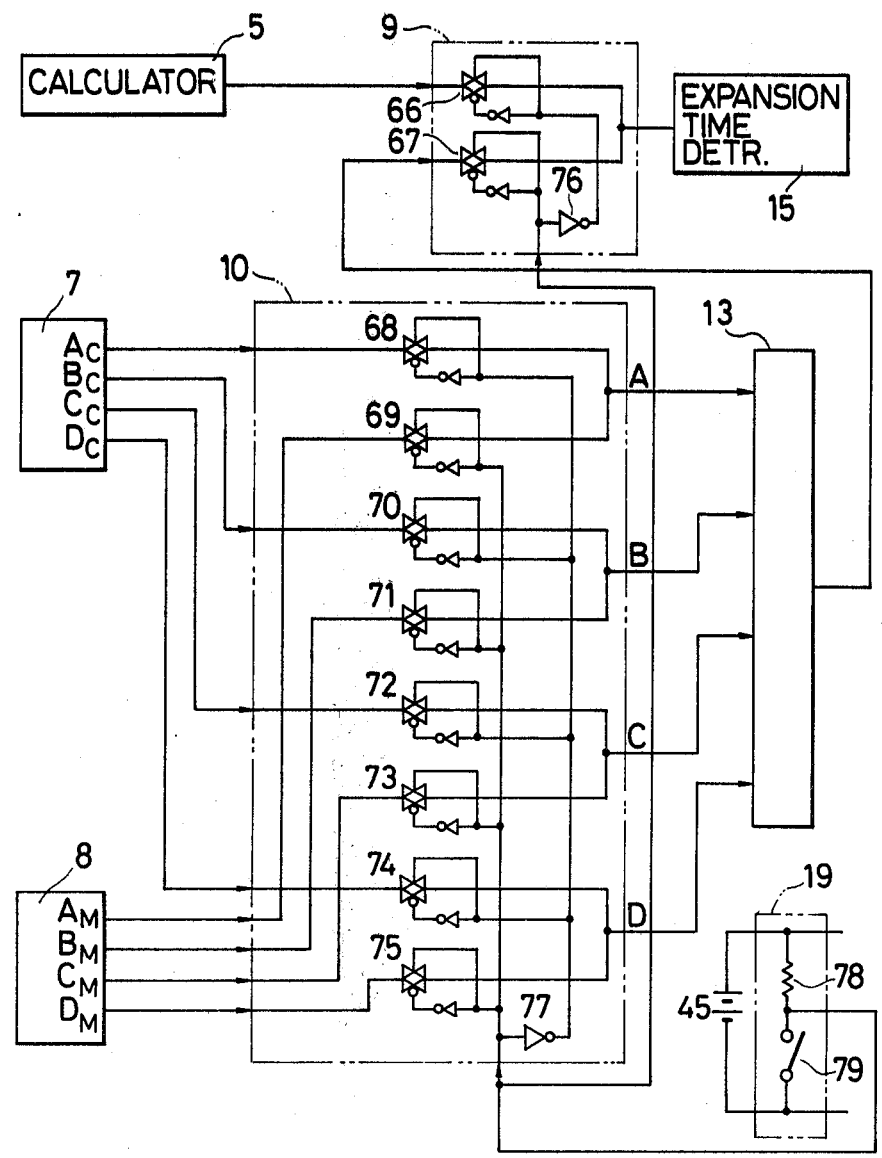
FIG. 4 is a circuit diagram, partly as a block diagram, showing examples of switching circuits 9 and 10 and an "AUTO"-"MANU" switching circuit of FIG. 1.

FIG. 4 shows examples of the switching circuit 9, the switching circuit 10 and the "AUTO"-"MANU" switching circuit 19. In FIG. 4, reference numerals 66 through 75 designate transmission gates (hereinafter referred to merely as "TG's" when applicable).

The outputs of the calculation circuit 5 and the D/A converter circuit 13 described before are applied to the TG's 66 and 67, respectively. The four bit outputs $A_C$, $B_C$, $C_C$ and $D_C$ of the counter 7 described above are applied to the TG's 68, 70, 72 and 74, respectively, while the outputs $A_M$, $B_M$, $C_M$ and $D_M$ of the manual exposure time setting circuit 8 are applied to the TG's 69, 71, 73 and 75, respectively. The output of the TG 69 is connected to the output of the TG 69, the output of the TG 70 is connected to the output of the TG 71, the output of the TG 72 is connected to the output of the TG 73, and the output of the TG 74 is connected to the output of the TG 75 to form the outputs A, B, C and D of the switching circuit 10, respectively.

In the "AUTO"-"MANU" switching circuit 19, a resistor 78 and a switch 79 are connected in series to the power source 45. The output of the circuit 19 is applied as a control signal to the TG's 67, 69, 71, 73 and 75 and is further applied as a control signal to the TG's 66, 68, 70, 72 and 74 through inverters 76 and 77.

The operation of the circuit in FIG. 4 will be described. When the switch 79 is turned on, a "0" signal is applied to the switching circuit 10 to therefore turn on the TG's 66, 68, 70, 72 and 74 while the TG's 67, 69, 71, 73 and 75 are turned off. Accordingly, the voltage of the calculation circuit 5 represented by the equation (11) is applied to the expansion time determination circuit 15 while the digital signal output from the counter 7 is applied to the D/A converter circuit 13.

When the switch 79 is turned off, a "1" signal is applied to the switching circuits 9 and 10. An operation opposite to that described is carried out as a result of which the digital signal of the manual exposure time setting circuit 8 is converted into analog data represented by the equation (14) by the D/A converter circuit 13 with the analog data then applied to the expansion time constant circuit 15.

Thus, as is clear from the above description, the "on" operation of the switch 79 corresponds to "AUTO" operation while the "off" operation corresponds to "MANU" operation.

Figure 5:
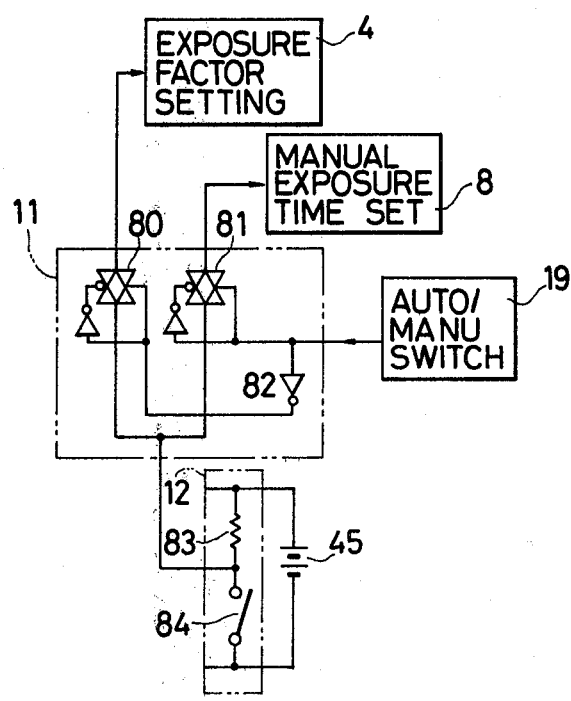
FIG. 5 is a circuit diagram, partly as a block diagram, illustrating examples of a switching circuit 11 and a switch circuit 12 of FIG. 1.

Shown in FIG. 5 are specific examples of the switching circuit 11 and the switch circuit 12. In FIG. 5, reference numerals 80 and 81 designates transmission gates. The inputs of the TG's 80 and 81 are connected to the switch circuit 12 which includes a resistor 83 and a switch 84 which are series-connected with the power source 45. The output of the "AUTO"-"MANU" switching circuit 19 is applied as a control signal to the TG 81 and to the TG 80 through an inverter 82.

The operation of the circuitry shown in FIG. 5 will be described. When the switch 79 in the "AUTO"-"MANU" switching circuit 19 is turned on or set to "AUTO", the TG 80 is turned on while the TG 81 is turned off. When, under this condition, the switch 84 is operated on, off and on, in that order, pulses "1", "0" and "1" are applied from the switch circuit 12 to the exposure factor setting circuit 4 again in the described order. The pulses are counted by the exposure factor setting circuit 4. Thus, an appropriate exposure factor can be set by turning off, on and off the switch 84. The output of the exposure factor setting circuit 4, althrough not specifically here illustrated, can readily be decoded and displayed.

In the case when the switch 79 is turned off or set to "MANU", the TG 80 is turned off while the TG 81 is turned on. Accordingly, the signals from the switch 84 are counted by the manual exposure time setting circuit 8, conversely to the above-described case, and the exposure time is set manually. Thus, the switch 84 serves as an exposure factor setting member in the case of "AUTO" and as a manual exposure time setting member in the case of "MANU".

Figure 6:
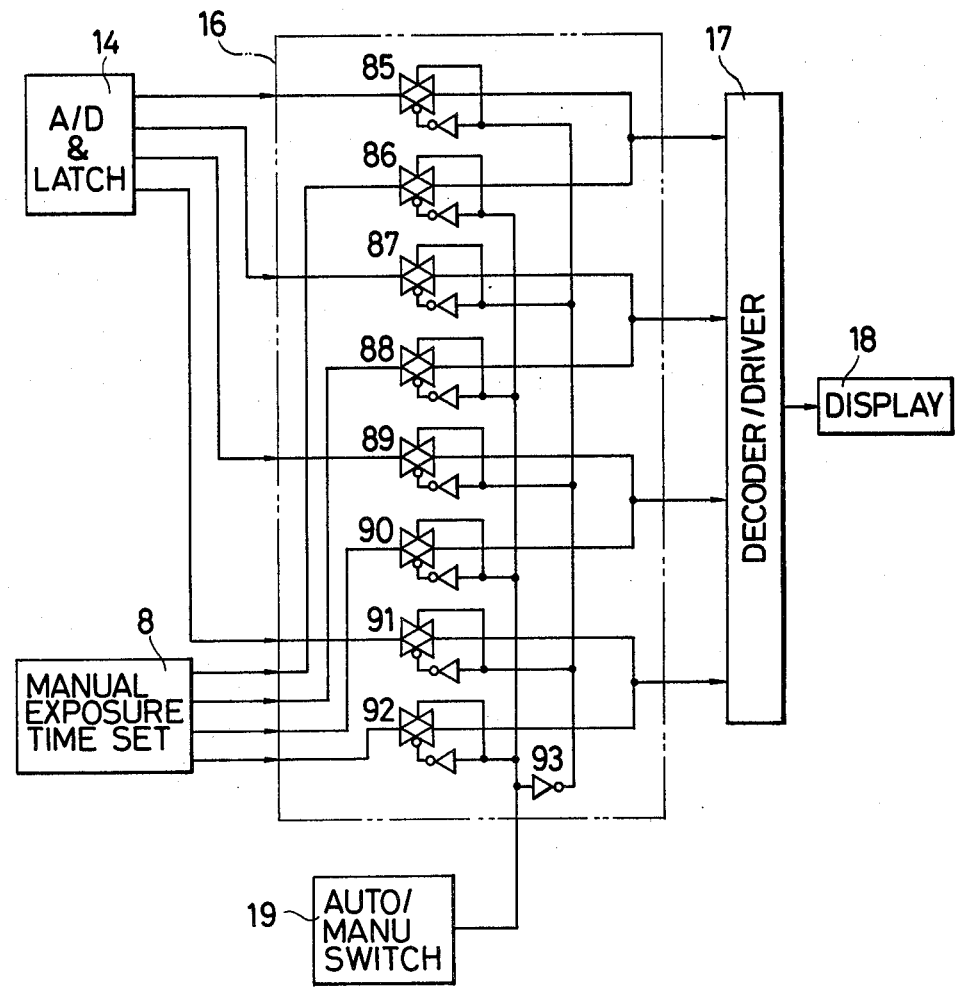
FIG. 6 is a circuit diagram, partly as a block diagram, showing an example of a switching circuit 16 of FIG. 1.

FIG. 6 shows a specific example of the switching circuit 16 which includes transmission gates 85 through 92. The output of the above-described A/D conversion and latch circuit is applied to the TG's 85, 87, 89 and 91 while the output of the manual exposure time setting circuit 8 is applied to the TG's 86, 88, 90 and 92. The outputs of the TG pairs 85 and 86, 87 and 88, 89 and 90, and 91 and 92 are commonly connected and are applied to the inputs of the decoder and driver circuit 17. The output of the "AUTO"-"MANU" switching circuit 19 is applied as a control signal to the TG's 86, 88, 90 and 90 and to the TG's 85, 87, 89 and 91 through an inverter 93.

The operation of the circuitry in FIG. 6 will be described. When the switch 79 in the "AUTO"-"MANU" switching circuit 19 is turned on or set to "AUTO", the output of the switching circuit 19 is set to "0" as a result of which the TG's 85, 87, 89 and 91 are turned on while the TG's 86, 88, 90 and 92 are turned off. Therefore, the output of the A/D conversion and latch circuit 14 is applied to the decoder and driver circuit 17 and, accordingly, the exposure time for the "AUTO" operational mode is displayed on the display element 18.

When the switch 79 is turned off, the output of the "AUTO"-"MANU" circuit 19 is raised to "1" and an operation opposite to the above-described operation is carried out. The output of the manual exposure time setting circuit 8 is applied to the decoder and driver circuit 17 as a result of which the exposure time in the "MANU" mode of operation is displayed on the display element 18.

While the invention has been described with reference to its preferred embodiment, it should be noted that the invention is not limited thereto or thereby. If the exposure factor setting circuit 4 and the manual exposure time setting circuit are provided in the form of up-down counters, the exposure factor and the manual exposure time can be provided using a so-called "up-down count system". Furthermore, if the manual exposure setting circuit is constructed with semiconductor devices such as C-MOS devices which have a low current consumption and power supply voltage is maintained to the circuit by a battery back-up system independent of the power switch, then a set manual exposure time can be stored. In addition, if the camera exposure time control circuit is so designed that the output of the manual exposure time setting circuit 8 is gated with an electronic flash light emission preparation completion signal and is applied to the switching circuits 10 and 16 and the electrode flash light emission preparation completion signal is applied to the "AUTO"-"MANU" switching circuit 19 so that it, gated with the signal from the switch 79, is employed as the output of the "AUTO"-"MANU" switching circuit 19, the exposure time can be automatically set to a value synchronous with the time of operation of the electronic flash.

As is apparent from the above description, the exposure time control circuit according to the invention has a very simple construction. In the exposure time control circuit, automatic exposure time data calculated through photometry or manual exposure time data manually set is applied through the switching circuits to the expansion time constant circuit so that either automatic or manual exposure control is effected. Furthermore, the manual exposure time is converted into digital data by simple switch means. Thus, with the exposure time control circuit according to the invention, the size of the circuitry can be effectively reduced, the reliability of the camera is improved and the size of the camera can be decreased.

What is claimed is:

1. An exposure time control circuit for a camera comprising: a calculation circuit connected for receiving logarithmic compression values of an object brightness, a film sensitivity, an aperture value and an exposure factor for calculating an automatic exposure time; an expansion time determination circuit for expanding an input voltage to provide an exposure time; an oscillator; a counter for counting pulses produced by said oscillator; a manual exposure time setting circuit for producing digital data corresponding to a manually set exposure time; and a digital-to-analog converter having an input coupled to an output of said manual exposure time setting circuit; a first switching circuit for selectively applying an output of said calculation circuit and an output of said digital-to-analog converter circuit to said expansion time determination circuit; and a second switching circuit for selectively applying an output of said counter and an output of said manual exposure time setting circuit to said digital-to-analog converter circuit, wherein, for automatic exposure time control, said first switching circuit couples the output of said calculation circuit to said expansion time determination circuit while said second switching circuit couples the output of said counter to said digital-to-analog converter circuit and wherein, for manual exposure time control, said first switching circuit couples the output of said digital-to-analog converter circuit to said expansion time determination circuit while said second switching circuit couples the output of said manual exposure time setting circuit to said digital-to-analog converter circuit.

2. An exposure time displaying circuit for a camera comprising: a calculation circuit connected for receiving the logarithmic compression values of an object brightness, a film sensitivity, an aperture value and an exposure factor for calculating an automatic exposure time; an analog-to-digital converter and latch circuit for analog-to-digital converting and latching an input voltage; an oscillator; a conter for counting pulses produced by said oscillator; a manual exposure time setting circuit for producing digital data corresponding to a manually set exposure time; a digital-to-analog converter circuit having an input coupled to an output of said manual exposure time setting circuit; a decoder and driver circuit for decoding received digital data for driving a display element; a first switching circuit for selectively applying an output of said analog-to-digital converter and latch circuit and an output of said manual exposure time setting circuit to said decoder and driver circuit; a second switching circuit for selectively applying an output of said counter and an output of said manual exposure time setting circuit to said digital-to-analog converter circuit; wherein for automatic exposure time control, said first switching circuit couples the output of said analog-to-digital converter and latch circuit to said decoder and driver circuit while said second switching circuit couples the output of said counter to said digital-to-analog converter circuit and for manual exposure time control said first switching circuit couples the output of said manual exposure time setting circuit to said decoder and driver circuit while said second switching circuit couples the output of said manual exposure time setting circuit to said digital-to-analog converter circuit.

3. An exposure time control circuit for a camera for both automatically and manually controlling an exposure time comprising: a manually operated switch for producing "on" and "off" control signals; an exposure factor setting circuit for setting an exposure factor in the form of digital data; and an exposure time setting circuit to set a manual exposure time in the form of digital data; and switch means for applying said "on" and "off" signals to said exposure factor setting circuit in an automatic mode of operation and to said manual exposure time setting circuit in a manual mode of operation.

* * * * *